(12) United States Patent
Hwang

(10) Patent No.: US 12,459,427 B2
(45) Date of Patent: Nov. 4, 2025

(54) MODULAR BLOCK LAMP FOR VEHICLES AND METHOD OF CONTROLLING THE SAME

(71) Applicant: HYUNDAI MOBIS CO., LTD., Seoul (KR)

(72) Inventor: Hyun Chang Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/989,528

(22) Filed: Dec. 20, 2024

(65) Prior Publication Data

US 2025/0319816 A1     Oct. 16, 2025

(30) Foreign Application Priority Data

Apr. 12, 2024   (KR) .................. 10-2024-0049127

(51) Int. Cl.
    *B60Q 1/50*    (2006.01)
    *B60Q 1/26*    (2006.01)

(52) U.S. Cl.
    CPC ........... *B60Q 1/543* (2022.05); *B60Q 1/2696* (2013.01); *B60Q 2400/20* (2013.01)

(58) Field of Classification Search
    CPC ............ B60Q 1/2696; B60Q 1/50–549; B60Q 2400/20
    See application file for complete search history.

(56) References Cited

U.S. PATENT DOCUMENTS 7,677,777 B2 *   3/2010   Woodward .............. F21S 41/24
                                                       362/240

* cited by examiner

*Primary Examiner* — Jason M Han
(74) *Attorney, Agent, or Firm* — NSIP Law

(57) ABSTRACT

A modular block lamp for vehicles, a method therefor, and a system therefor are provided. The modular block lamp includes an optic including a pixel of the modular block lamp, a plate to which the optic is mounted, and a controller to control the optic and the plate, receive a lamp pattern design selected by a user, determine whether the optic is mounted, compare a pattern of the mounted optic with a preset lamp pattern design, and control at least one of a color and an output timing of an LED included in the optic in response to a result of the comparison.

14 Claims, 10 Drawing Sheets

MODULAR BLOCK LAMP FOR VEHICLES AND METHOD OF CONTROLLING THE SAME

CROSS-REFERENCE TO RELATED APPLICATION(S)

This application claims the benefit under 35 USC § 119 of Korean Patent Application No. 10-2024-0049127, filed on Apr. 12, 2024, in the Korean Intellectual Property Office, the entire disclosure of which is hereby incorporated by reference for all purposes.

BACKGROUND

1. Field

Embodiments of the present disclosure are applicable to vehicles in any field, and more particularly to a vehicle including a modular block lamp for vehicles.

2. Description of the Related Art

In general, a vehicle is equipped with various types of vehicle lamps that have an illumination function to facilitate viewing of objects located around the vehicle during nighttime driving and a signaling function to inform other vehicles or road users of the driving state of the vehicle.

For example, a headlamp and a fog lamp are primarily intended for illumination, while a turn signal lamp, a tail lamp, a brake lamp, and a side marker are primarily intended for signaling. In addition, the installation standards and specifications of these vehicle lamps are prescribed by law to ensure that the vehicle lamps fully fulfill respective functions.

Particularly, in the case of a vehicle lamp including an MLA lens unit, the MLA lens unit is very small and may be provided with a very large number of optics in a small space, such as 250 to 300 optics in a lens of 1.5 cm in size.

Conventional vehicle lamps are trend-sensitive and do not carry over well with the development of each vehicle model, and the version of a specific vehicle model usually utilizes only one design, thus limiting the driver's choice.

SUMMARY

The present disclosure is to address at least the above-mentioned problems and/or disadvantages and to provide at least the advantages described below. Accordingly, an object of the present disclosure is to provide a modular block lamp for vehicles that changes a lamp design by exchanging optics.

Objects of the present disclosure are not limited to the aforementioned object, and other unmentioned objects will be clearly understood by a person having ordinary skill in the art to which the present disclosure pertains based on the following description.

In a general aspect of the disclosure, a modular block lamp for vehicles, includes: an optic comprising a pixel of the modular block lamp; a plate to which the optic is mounted; and a controller configured to: control the optic and the plate; receive a lamp pattern design selected by a user; determine whether the optic is mounted; compare a pattern of the mounted optic with a preset lamp pattern design; and control at least one of a color and an output timing of an LED included in the optic in response to a result of the comparison.

The optic may include an emitter comprising the LED, and a fixture located under the emitter in contact with the plate, wherein the fixture may be configured to receive a signal.

The plate may include a circuit configured to transmit and receive signals to and from the optic, wherein the circuit may include a vertical conducting wire and a horizontal conducting wire, and wherein the optic may be fastened to an intersection of the conducting wires.

The controller may be further configured to: determine the pattern of the mounted optic by deriving coordinates of the optic; and determine whether the pattern of the optic matches the design pattern selected by the user.

In response to the pattern of the optic matching the design pattern selected by the user, the controller may be further configured to provide a drivable state alarm.

In response to the pattern of the optic not matching the design pattern selected by the user, the controller may be further configured to provide a lamp pattern design error state alarm.

The modular block lamp may further include a bezel configured to be fastened to the plate, wherein at least one of a plurality of optics and bezels may be disposed on the plate in response to the design being selected by the user.

In another general aspect of the disclosure, a method of controlling a modular block lamp for vehicles, the modular block lamp including an optic constituting a pixel of the lamp, a plate to which the optic is mounted, and a controller configured to control the optic and the plate, the method includes: receiving, by the controller, a lamp pattern design selected by a user; determining whether the optic is mounted to the plate; comparing a pattern of the mounted optic with a preset lamp pattern design; and controlling at least one of a color and an output timing of an LED included in the optic in response to a result of the comparison.

The step of determining whether the optic is mounted to the plate may include determining the pattern of the mounted optic by deriving coordinates of the optic, wherein the step of comparing the pattern of the mounted optic with the preset lamp pattern design may include determining whether the pattern of the optic matches the design pattern selected by the user.

The method may further include: providing a drivable state alarm in response to the pattern of the optic matching the design pattern selected by the user; and providing a lamp pattern design error state alarm in response to the pattern of the optic not matching the design pattern selected by the user.

In yet another general aspect of the disclosure, a lighting system for a vehicle, includes: a modular block lamp including a plurality of optics each comprising a pixel of the modular block lamp, and a plate for mounting the optics; a user interface configured to receive a lamp pattern design selected by a user in the vehicle; and a controller configured to: control each of the optics; receive the lamp pattern design selected by the user from the user interface; determine whether the optics are mounted; compare a pattern of the mounted optics with a preset lamp pattern design; and in response to a result of the comparison, control at least one of a color of an LED included in each of the optics, an output timing of the LED, or a combination thereof.

Each of the optics may include an emitter comprising the LED, and a fixture located under the emitter in contact with the plate, wherein the fixture may be configured to receive a signal.

The plate may include one or more circuits configured to transmit and receive signals to and from the optics, wherein each of the one or more circuits may include a vertical conducting wire and a horizontal conducting wire, and wherein the optics may be fastened to an intersection of the conducting wires.

The controller may be further configured to: determine the pattern of the mounted optics by deriving coordinates of the mounted optics; and determine whether the pattern of the optics matches the design pattern selected by the user.

BRIEF DESCRIPTION OF THE DRAWINGS

The accompanying drawings, which are included to provide a further understanding of the present disclosure and are incorporated in and constitute a part of this application, show embodiment(s) of the present disclosure and together with the description serve to explain the principle of the present disclosure. In the drawings.

DETAILED DESCRIPTION

Hereinafter, embodiments of the present disclosure will be described in detail with reference to the accompanying drawings so that those skilled in the art to which the present disclosure pertains may easily implement the present disclosure. However, the present disclosure may be implemented in various different forms and is not limited to the embodiments described herein. In addition, in order to clearly describe this disclosure in drawings, parts unrelated to the description are omitted and similar reference numbers are given to similar parts throughout the specification.

Throughout the specification, when a part "includes" a certain component, this means that it may further include other components, rather than excluding other components, unless otherwise stated.

Figure 1:
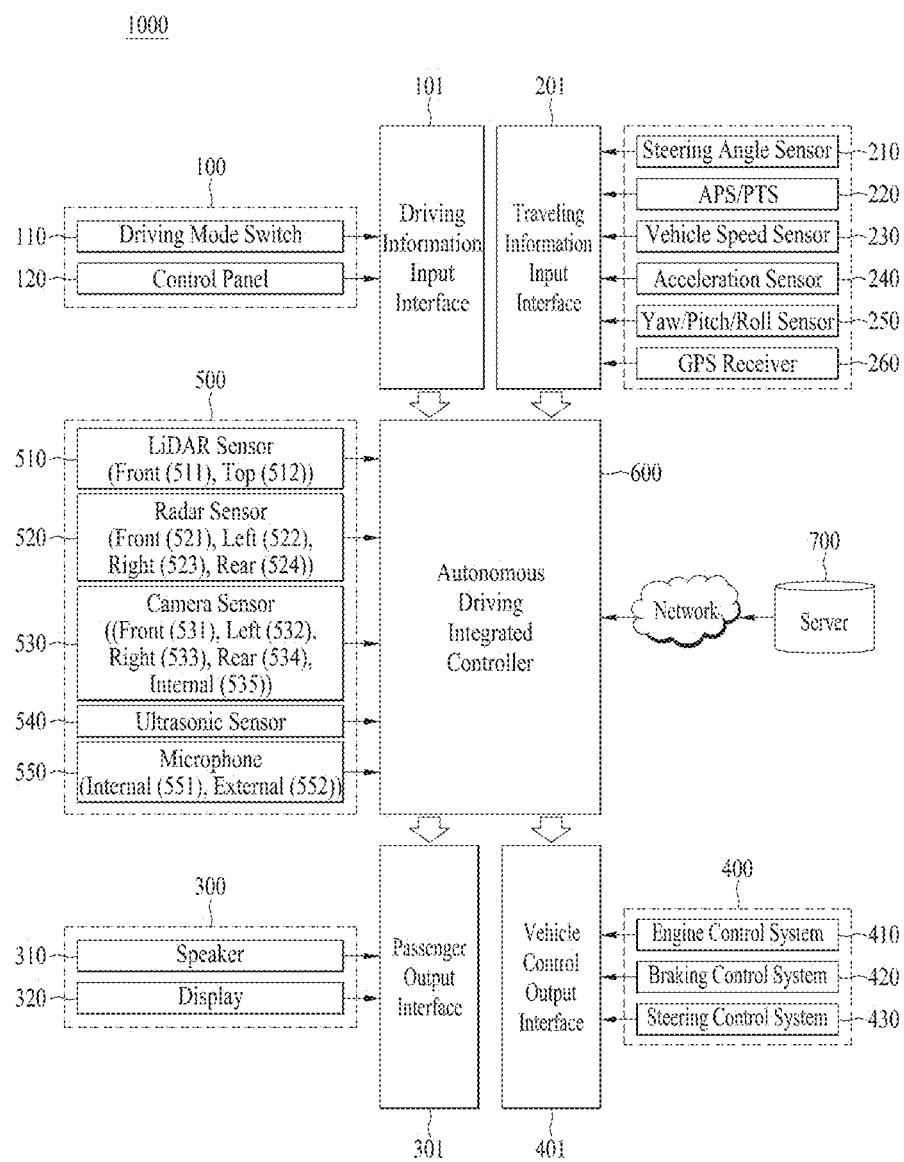
FIG. 1 is an overall block diagram of an autonomous driving control system to which an autonomous driving apparatus according to any one of embodiments of the present disclosure is applicable.
Figure 2:
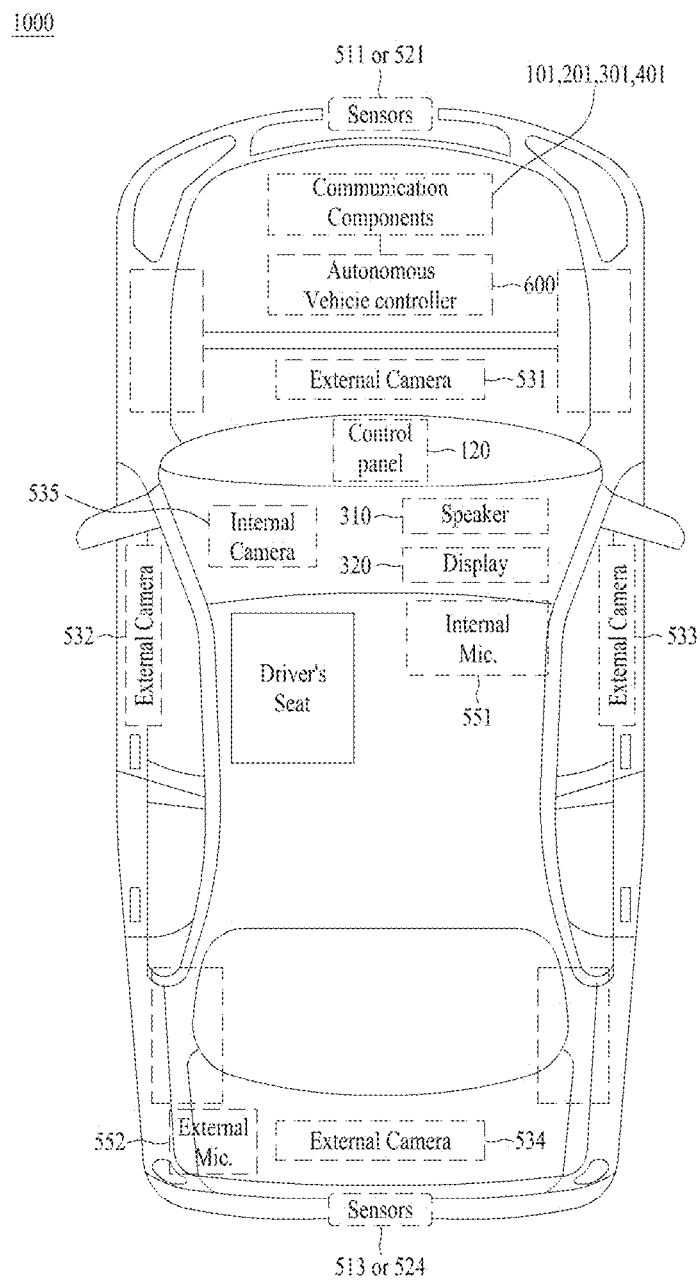
FIG. 2 is a diagram illustrating an example in which an autonomous driving apparatus according to any one of embodiments of the present disclosure is applied to a vehicle.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
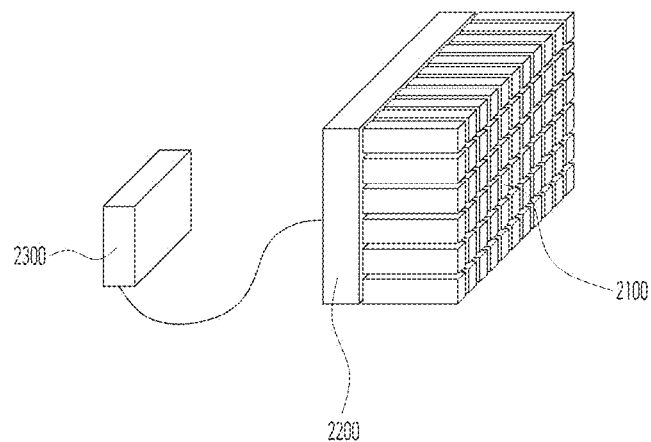
FIG. 3 is a view illustrating a modular block lamp for vehicles according to an embodiment of the present disclosure.

FIG. 3 is a view illustrating a modular block lamp for vehicles according to an embodiment of the present disclosure.

Referring to FIG. 3, the modular block lamp 2000 for vehicles may include an optic 2100, a plate 2200, and a controller 2300.

The optic 2100 may constitute a pixel of the modular block lamp for vehicles. To this end, the optic 2100 may include a high-resolution LED. The optic 2100 may perform a lamp function by emitting light from the LED through reflection and refraction.

The optic 2100 may be individually configured for each LED to express various colors. That is, the optic 2100 may be controllable when fastened to the plate 2200 such that the same optic may be functionally selectable depending on the lamp function.

The plate 2200 may fasten a plurality of optics to each other. To this end, the plate 2200 may include a circuit configured to control the LED in a fastening portion in the form of a recessed hemisphere.

The plate 2200 may not allow current to flow when no optic 2100 is connected to the circuit to enable bezel attachment.

The controller 2300 may receive a user-selected lamp pattern design. At this time, the controller 2300 may determine from the user which design pattern is available as the lamp. In this case, the available design pattern may be an image that satisfies regulations.

The controller 2300 may determine whether the optic 2100 is mounted. That is, the controller 2300 may determine whether the LED included in each of the plurality of optics 2100 is fastened.

The controller 2300 may compare the pattern of the installed optics to a preset lamp pattern design.

The controller 2300 may perform overall control, such as outputting or timing LED colors to match an input image.

The controller 2300 may control at least one of the color of the LED included in the optic and the output timing in response to the result of the lamp pattern design comparison.

Figure 4:
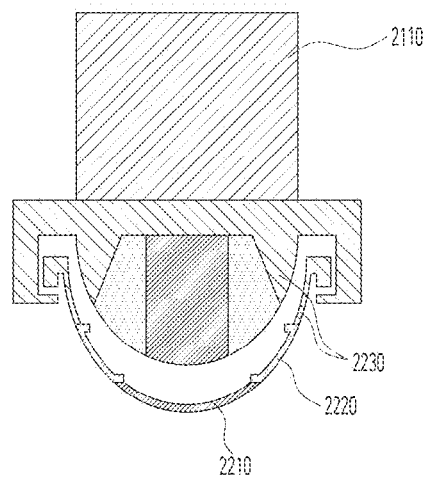
FIG. 4 is a sectional view of the modular block lamp for vehicles according to the embodiment of the present disclosure.

FIG. 4 is a sectional view of the modular block lamp for vehicles according to the embodiment of the present disclosure.

Referring to FIG. 4, the optic 2100 may include an emitter 2110 and a fixture 2120.

The fixture 2120 of the optic may be surface-treated such that signal transmission is possible and thus transmit and receive signals in a state of being fastened to the plate 2200.

The plate 2200 may be formed in a structure in which the fixture 2120 of the optic is easily mounted thereto and not easily spontaneously detachable therefrom.

The structure of the plate 2200 may be formed with semispherical contacts that can signal from either side.

For example, the structure of the plate 2200 may include a first region 2210 that transmits a control signal, a second region 2220 that transmits a (+) signal, and a third region 2230 that serves as a GND.

Figure 5:
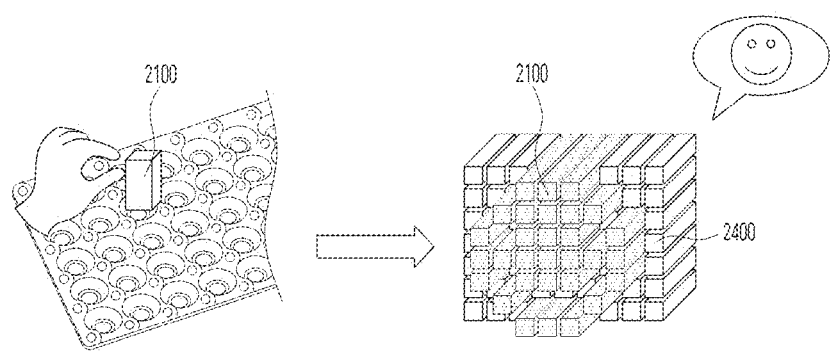
FIG. 5 is a view illustrating selection of a lamp pattern design of the modular block lamp for vehicles according to the embodiment of the present disclosure.

FIG. 5 is a view illustrating selection of a lamp pattern design of the modular block lamp for vehicles according to the embodiment of the present disclosure.

Referring to FIG. 5, since the lamp pattern design applied to the vehicle must satisfy regulations, various patterns that satisfy regulations may be configured as a database. Based on such a database, a user may select a user-desired pattern among the various patterns to configure a lamp pattern design.

Accordingly, the user may select a lamp pattern design to be applied to the vehicle, and may fasten the optics 2100 to the plate 2200 based on the selected lamp pattern design.

The user may mount the optics 2100 and a bezel 2400 on the plate to match the selected pattern. The user may mount the optics in the region on the plate that corresponds to the pattern and the bezel in the region that does not correspond to the pattern.

In addition, the user may express a lamp image through DIY (Do It Yourself) in the registered design pattern. That is, the user may express the lamp image through optic blocks and bezel blocks of various designs.

Figure 6:
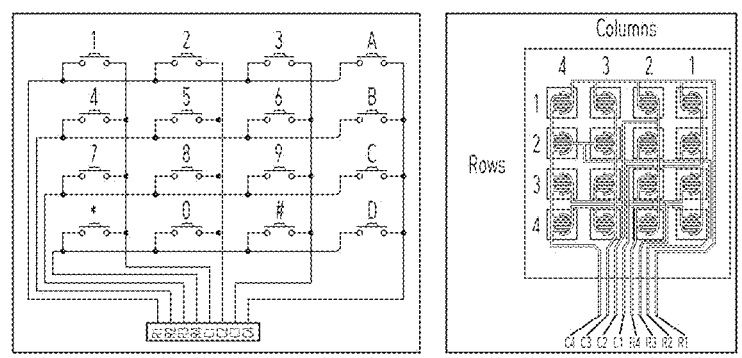
FIG. 6 is a view illustrating a method of detecting the lamp pattern design of the modular block lamp for vehicles according to the embodiment of the present disclosure.

FIG. 6 is a view illustrating a method of detecting the lamp pattern design of the modular block lamp for vehicles according to the embodiment of the present disclosure.

Referring to FIG. 6, the plate may include a circuit configured to allow signals to be transmitted to and received from the optics. The circuit of the plate is configured such that conducting wires are arranged in the form of a matrix. That is, the circuit of the plate may include vertical conducting wires and horizontal conducting wires, and the optics 2100 may be disposed at positions where the horizontal conducting wires (row) and the vertical conducting wires (column) join each other.

The controller 2300 may perform user optic mounting inspection by running a current in the transverse direction (row) of the plate 2200.

The controller 2300 may determine that rows with the optics 2100 mounted in the plate 2200 are low.

The controller 2300 may determine that rows with no optics 2100 mounted in the plate 2200 are floating.

The controller 2300 may derive the coordinates of the optics 2100 by passing current through the rows with the optics 2100 mounted in the plate 2200.

The controller 2300 may derive the coordinates of the optics 2100 and compare the same to the pre-stored design pattern.

The controller 2300 may determine fail if the derived coordinates do not match the pre-stored design pattern based on the comparison result.

The controller 2300 may determine pass if the derived coordinates match the pre-stored design pattern based on the comparison result.

Accordingly, the controller 2300 may automatically detect the optics 2100 mounted to the plate 2200 to determine if the optics match the selected design pattern.

Figure 7:
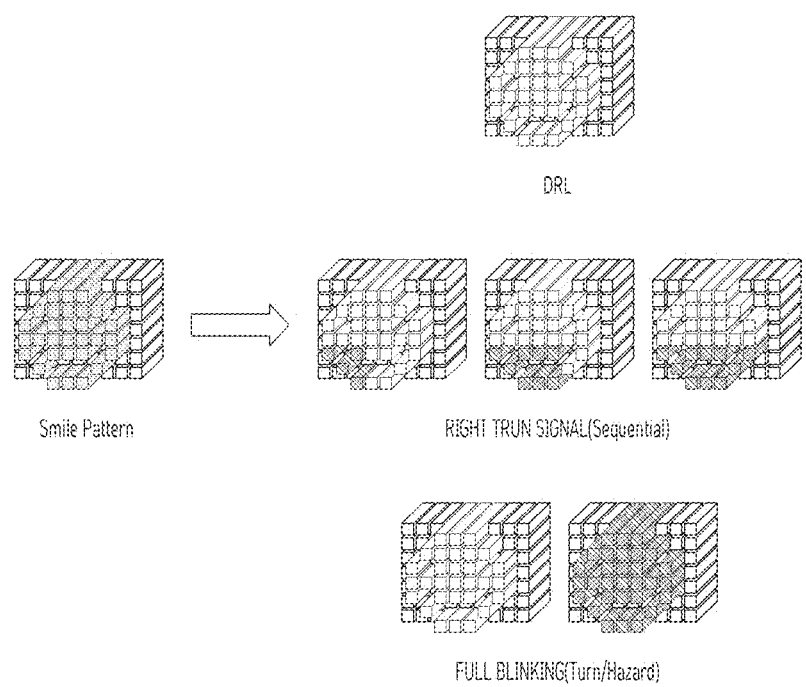
FIG. 7 is a view illustrating the operation of the modular block lamp for vehicles according to the embodiment of the present disclosure.

FIG. 7 is a view illustrating the operation of the modular block lamp for vehicles according to the embodiment of the present disclosure.

Referring to FIG. 7, the modular block lamp for vehicles may provide the function of the lamp based on the optics configured at the time of registration of the lamp design pattern. In this case, the function of the lamp may include operations configured to satisfy regulations.

As shown in FIG. 7, the user may select a smile image as the lamp pattern design, and may configure a smile pattern using the optics 2100 and bezels 2400. At this time, the optics 2100 corresponding to the smile pattern may be lit with a yellow color.

If the function of the vehicle lamp is daytime running lamp/light (DRL), the optics 2100 corresponding to the smile pattern may be lit with a white color.

If the function of the vehicle lamp is a right turn signal, the optics 2100 corresponding to the smile pattern may be lit in some regions in response to the right turn signal.

At this time, the optics 2100 corresponding to the smile pattern may be sequentially or fully blinked.

For example, if the optics 2100 are sequentially blinked, the bottom left of the smile pattern may start to be blinked, followed by the lower middle of the smile pattern, and finally the entirety of the lower end of the smile pattern may be blinked.

When the function of the vehicle lamp is turn/hazard, the optics 2100 corresponding to the smile pattern may be fully blinked. Accordingly, the optics 2100 corresponding to the smile pattern may be blinked with alternating white and yellow colors.

Figure 8:
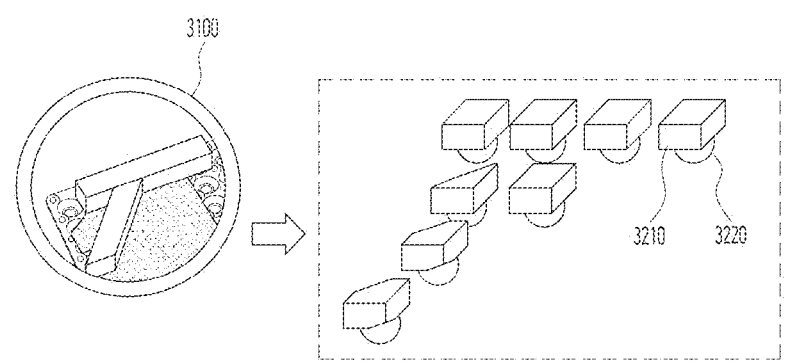
FIG. 8 is a view illustrating application of a design of the modular block lamp for vehicles according to the embodiment of the present disclosure.

FIG. 8 is a view illustrating application of a design of the modular block lamp for vehicles according to the embodiment of the present disclosure.

Referring to FIG. 8, in the modular block lamp 2000 for vehicles, a combination of optics 2100 having various shapes may be disposed on the plate 2200 according to a set design 3100. In this case, an emitter 3210 of the optic may include shapes applicable to a variety of designs. The emitter 3210 of the optic may be represented in various ways, such as a surface light emitting optic or an MCL optic. The optics 2100 disposed on the plate 2200 may include fixtures 3220 having the same shape.

For example, the modular block lamp 2000 for vehicles may be configured to have a design including straight and oblique lines. In this case, the straight design may be achieved through a combination of a plurality of optics in the form of a rectangle. In addition, the oblique design may be achieved through a combination of a plurality of optics in the form of polygons.

Figure 9:
FIG. 9 is a view illustrating a vehicle-specific modular block lamp for vehicles according to an embodiment of the present disclosure.

FIG. 9 is a view illustrating a vehicle-specific modular block lamp for vehicles according to an embodiment of the present disclosure.

Referring to FIG. 9, the modular block lamp 2000 for vehicles allows only the plates of the optics to be disposed for different vehicle lamp sizes without the need to change the overall design of the lamp.

Depending on the type of vehicle, the lamp may be configured in a planar, oblique, or dual arrangement.

For example, if the lamp has a planar arrangement, the plate may have a size of 11×5 depending on the vehicle type.

For example, if the lamp has an oblique arrangement, the plate may have a size of 10×4 depending on the vehicle type.

For example, if the lamp has a dual arrangement, each of the two plates can have a size of 6×4 depending on the vehicle type. In the dual arrangement, the plates may be disposed differentially in front and behind.

A modular lamp apparatus for vehicles may express various designs on the plate through the disposition of the optics. Thus, the modular block lamp 2000 for vehicles has the advantage of securing design diversity by varying the size of the plate, thereby achieving modularization of the lamp.

Figure 10:
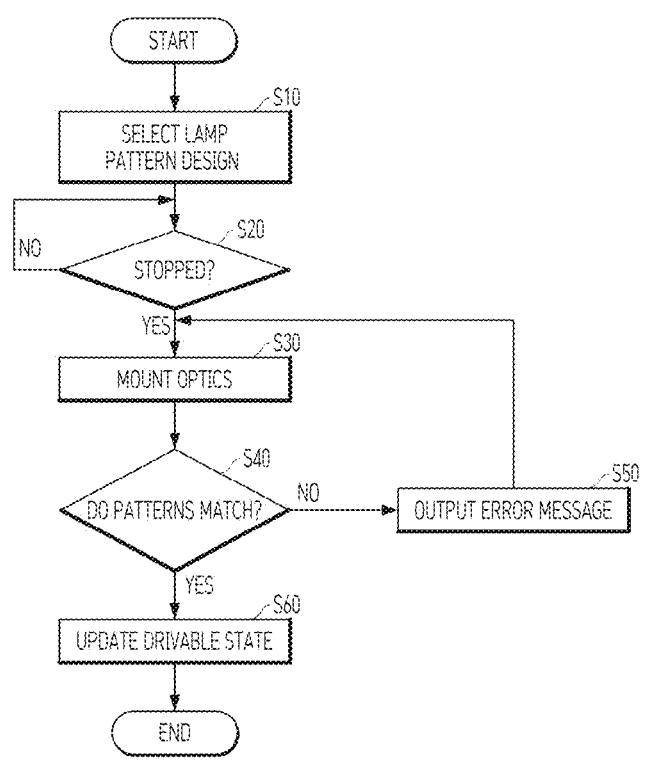
FIG. 10 is a flowchart illustrating a method of controlling a modular block lamp for vehicles according to an embodiment of the present disclosure.

FIG. 10 is a flowchart illustrating a method of controlling a modular block lamp for vehicles according to an embodiment of the present disclosure.

Referring to FIG. 10, the control method may be performed by a lamp module or a controller. Hereinafter, the control method will be described as being performed by the controller.

The controller 2300 may determine whether information related to a lamp pattern design has been selected (S10). If the information related to the lamp pattern design has not been selected, the method is terminated.

The information related to the lamp pattern design is provided to determine whether the operation based on lamp installation is possible, and may include design pattern information that satisfies lamp regulations.

The controller 2300 may obtain the information related to the lamp pattern design and may determine whether the vehicle is stopped (S20). If the vehicle is not stopped, the controller 2300 may continuously monitor the driving state of the vehicle.

If the vehicle is stopped, the controller 2300 may determine whether the optics have been installed (S30).

The controller 2300 may determine whether a pattern match has been made based on the installation of the optics (S40). The pattern match may be determined by comparing the position information of the optics mounted on the plate with the set lamp pattern design information.

The controller 2300 may output an error message if the pattern match has not been made based on the installation of the optics (S50). The error message may be a message that the lamp pattern does not satisfy the conditions for driving.

If the pattern match has not been made based on the installation of the optics, the controller 2300 may update the vehicle to a drivable state (S60). As a result, the controller 2300 may determine that the lamp pattern satisfies the conditions for driving, and may provide a message that the vehicle is drivable.

For example, if the pattern of the optics matches a design pattern selected by the user, the controller may provide an alarm indicating that the vehicle is drivable.

The description related to FIGS. 1 to 9, which has not been given with reference to FIG. 10, may be applied to the method of controlling the modular block lamp for vehicles.

Meanwhile, a modular block lamp 2000 for vehicles including a controller 2300 described with reference to FIGS. 1 to 9 is proposed in accordance with an embodiment of the present disclosure. A vehicle 1000 including the modular block lamp 2000 for vehicles may determine whether the vehicle is driving or not based on the information related to the lamp pattern design.

That is, the technical ideas of the present disclosure may be applicable to the entirety of a vehicle or may be applicable to only some components in the vehicle. The scope of right of the present disclosure is to be determined by the appended claims.

As another aspect of the present disclosure, the operation of the aforementioned proposal or disclosure may be provided in the form of code that can be implemented, performed, or executed by a "computer" (a broad concept that includes a system on chip (SoC) or a microprocessor), or an application, computer-readable storage medium, or computer program product storing or including the code, which also falls within the scope of right of the present disclosure.

As is apparent from the above description, any one of the embodiments of the present disclosure has the effect of providing diversity in the design of a lamp for vehicles by replacing only the optics of the lamp.

In addition, any one of the embodiments of the present disclosure has the effect of lowering costs and increasing satisfaction in the development of the lamp for vehicles.

The effects of the present disclosure are not limited to those mentioned above, and other unmentioned effects will be clearly understood by a person having ordinary skill in the art to which the present disclosure pertains from the above description.

The detailed description of the preferred embodiments of the present disclosure described above is provided to enable those skilled in the art to implement and practice the present disclosure. Although the above has been described with reference to preferred embodiments of the present disclosure, it will be understood by those skilled in the art that various modifications and changes can be made to the present disclosure without departing from the scope of the present disclosure. For example, those skilled in the art may use a combination of the configurations described in the embodiments described above.

Accordingly, the present disclosure is not intended to be limited to the embodiments described above, but rather to give the broadest scope consistent with the principles and novel features disclosed herein.

What is claimed is:

1. A modular block lamp for vehicles, the modular block lamp comprising:
   an optic comprising a pixel of the modular block lamp;
   a plate to which the optic is mounted; and
   a controller configured to:
      control the optic and the plate;
      receive a lamp pattern design selected by a user;
      determine whether the optic is mounted;
      compare a pattern of the mounted optic with a preset lamp pattern design; and
      control at least one of a color and an output timing of an LED included in the optic in response to a result of the comparison.

2. The modular block lamp according to claim 1, wherein the optic comprises:
   an emitter comprising the LED; and
   a fixture located under the emitter in contact with the plate, and
   wherein the fixture is configured to receive a signal.

3. The modular block lamp according to claim 2, wherein the plate comprises a circuit configured to transmit and receive signals to and from the optic,
   wherein the circuit comprises a vertical conducting wire and a horizontal conducting wire, and
   wherein the optic is fastened to an intersection of the conducting wires.

4. The modular block lamp according to claim 3, wherein the controller is further configured to:
   determine the pattern of the mounted optic by deriving coordinates of the optic; and
   determine whether the pattern of the optic matches the design pattern selected by the user.

5. The modular block lamp according to claim 4, wherein, in response to the pattern of the optic matching the design pattern selected by the user, the controller is further configured to provide a drivable state alarm.

6. The modular block lamp according to claim 4, wherein, in response to the pattern of the optic not matching the design pattern selected by the user, the controller is further configured to provide a lamp pattern design error state alarm.

7. The modular block lamp according to claim 3, further comprising:
   a bezel configured to be fastened to the plate,
   wherein at least one of a plurality of optics and bezels is disposed on the plate in response to the design being selected by the user.

8. A method of controlling a modular block lamp for vehicles, the modular block lamp including an optic constituting a pixel of the lamp, a plate to which the optic is mounted, and a controller configured to control the optic and the plate, the method comprising:
   receiving, by the controller, a lamp pattern design selected by a user;
   determining whether the optic is mounted to the plate;
   comparing a pattern of the mounted optic with a preset lamp pattern design; and controlling at least one of a color and an output timing of an LED included in the optic in response to a result of the comparison.

9. The method according to claim 8,
wherein the step of determining whether the optic is mounted to the plate comprises determining the pattern of the mounted optic by deriving coordinates of the optic, and
wherein the step of comparing the pattern of the mounted optic with the preset lamp pattern design comprises determining whether the pattern of the optic matches the design pattern selected by the user.

10. The method according to claim 9, further comprising:
providing a drivable state alarm in response to the pattern of the optic matching the design pattern selected by the user; and
providing a lamp pattern design error state alarm in response to the pattern of the optic not matching the design pattern selected by the user.

11. A lighting system for a vehicle, the system comprising:
a modular block lamp comprising:
a plurality of optics each comprising a pixel of the modular block lamp; and
a plate for mounting the optics;
a user interface configured to receive a lamp pattern design selected by a user in the vehicle; and
a controller configured to:
control each of the optics;
receive the lamp pattern design selected by the user from the user interface;
determine whether the optics are mounted;
compare a pattern of the mounted optics with a preset lamp pattern design; and
in response to a result of the comparison, control at least one of a color of an LED included in each of the optics, an output timing of the LED, or a combination thereof.

12. The system according to claim 11,
wherein each of the optics comprises:
an emitter comprising the LED; and
a fixture located under the emitter in contact with the plate, and
wherein the fixture is configured to receive a signal.

13. The system according to claim 12,
wherein the plate comprises one or more circuits configured to transmit and receive signals to and from the optics,
wherein each of the one or more circuits comprises a vertical conducting wire and a horizontal conducting wire, and
wherein the optics are fastened to an intersection of the conducting wires.

14. The system according to claim 13, wherein the controller is further configured to:
determine the pattern of the mounted optics by deriving coordinates of the mounted optics; and
determine whether the pattern of the optics matches the design pattern selected by the user.

* * * * *